United States Patent [19]

Palmaer et al.

[11] Patent Number: 5,224,583

[45] Date of Patent: Jul. 6, 1993

[54] LOW BACK PRESSURE PLASTIC CONVEYOR

[76] Inventors: Karl V. Palmaer, 6525 Puerto Dr., Rancho Murieta, Calif. 95683; Eric K. Palmaer, 11749 Melones Cir., Gold River, Calif. 95670

[21] Appl. No.: 926,480

[22] Filed: Aug. 7, 1992

Related U.S. Application Data

[63] Continuation-in-part of Ser. No. 594,623, Oct. 9, 1990, Pat. No. 5,181,601.

[51] Int. Cl.⁵ ............................................. B65G 17/00
[52] U.S. Cl. .................................. 198/779; 198/852; 198/853
[58] Field of Search ............... 198/852, 853, 778, 779, 198/838, 845, 831

[56] References Cited

U.S. PATENT DOCUMENTS

| | | | |
|---|---|---|---|
| 4,231,469 | 11/1980 | Arscott | 198/779 |
| 4,742,907 | 5/1988 | Palmaer | 198/831 |
| 4,821,869 | 4/1989 | Hodlewsky | 198/779 |
| 4,909,380 | 3/1990 | Hodlewsky | 198/779 |
| 4,949,838 | 8/1990 | Lapeyre et al. | 198/853 |
| 4,993,540 | 2/1991 | van Capelleveen | 198/852 X |
| 4,993,554 | 2/1991 | Bailey et al. | 198/834 |
| 5,174,439 | 12/1992 | Spangler et al. | 198/852 X |

FOREIGN PATENT DOCUMENTS 392180 3/1924 Fed. Rep. of Germany ...... 198/838

Primary Examiner—Robert P. Olszewski
Assistant Examiner—Cheryl L. Gastineau
Attorney, Agent, or Firm—Thomas M. Freiburger

[57] ABSTRACT

A plastic conveyor belt, formed of plastic modules having rows of first and second projections extending in opposite directions, is adapted to optionally receive one or more rollers for reducing backline pressure on the belt. The rollers are positioned directly on the connecting rods which extend transversely through the belt, by occupying positions where projections in a row of projections would otherwise occur. A module having one or more of such openings or voids may be a part of a set of component modules, some having voids for receiving rollers and some not having such voids. A belt may be formed of mixtures of said modules, with or without any rollers on the belt. In one preferred embodiment the modules are for a radius type conveyor, with the second projections having elongated, slotted openings to allow the modules to angularly collapse together at curves.

17 Claims, 3 Drawing Sheets

LOW BACK PRESSURE PLASTIC CONVEYOR

REFERENCE TO RELATED APPLICATION

This application is a continuation-in-part of application Ser. No. 594,623, filed Oct. 9, 1990, now U.S. Pat. No. 5,181,601.

BACKGROUND OF THE INVENTION

This invention relates generally to plastic conveyor belts, typically used in the food industry. More specifically the invention is concerned with belts made up of plastic interdigited modules connected by transverse rods, and with an improvement whereby the modules or some of the modules can be readily converted to support rollers in order to reduce back pressure of items carried on the conveyor.

Examples of plastic conveyor belts having interdigited modules are shown in U.S. Pat. Nos. 4,472,907, 4,949,838 and 4,993,554, as well as in application Ser. No. 594,623 referenced above. Accumulation-type or low back pressure-type conveyors are shown in U.S. Pat. Nos. 4,231,469, 4,821,869 and 4,909,380. The referenced '469 patent shows a low back pressure-type conveyor having connecting rods which secure the modules together and also serve to support rollers positioned at spaced locations on the rods. However, unlike the belt system of the present invention, in that patent (FIG. 7) the projections from module to module were not interdigited in alternating arrangement but instead had a pair of projections from one module positioned between a wider-spaced pair of projections from the next module. A roller was then positioned between the inner ones of these four projections. In addition, the accumulating belt of that patent was not capable of travel around curves, as opposed to one embodiment of the present invention.

It is a primary purpose of the present invention to provide a modular plastic conveyor belt system wherein accumulation rollers can be easily added at selected positions in situations where low back pressure is desired, supported by the connecting rods, and without modifying the basic modules or affecting the integrity of the conveyor belt.

SUMMARY OF THE INVENTION

The plastic modules and belt system of this invention enable the inclusion of a limited number of low back pressure rollers in the conveyor belt assembly, supported by the connecting rods themselves, without changing the structure of the modules. In one embodiment, the belt and modules of the invention are of the radius type, with slotted rod holes in one set of projections on each module to enable travel either straight or around curves. In another embodiment this feature is incorporated in a belt capable of straight travel only (i.e. without lateral curves).

In one preferred embodiment of the invention a plastic belt module for curving travel has sets of projections extending both forward and rear, one set of projections having slotted holes to facilitate the angular collapse of the modules together toward the inside of a lateral curve. One set of projections has one or more interruptions where the position normally occupied by a projection is vacant. In these positions a roller can optionally be placed when the modules are assembled by insertion of the rods. In this way, a conveyor belt made up of the modules of the invention can be selectively made to have a low back pressure feature, to the extent desired, without requiring any modification of the belt structure itself.

The strength of the belt from module to module is not compromised to any great extent by omission of one or more projections from some of the modules. In a radius type belt, tensile strength of the belt while traveling straight is ordinarily not critical, and the belt generally does not rely on each and every projection-to-projection joint in providing adequate strength for straight travel. What is critical in a belt adapted to travel around curves is the tensile strength at the edges of the belt, from module to module. When the belt travels around a curve, virtually the entire tension stress or pulling force in the belt is carried at the outside of the curve, with zero tension at inward locations such as the positions where projections are omitted in accordance with the invention. This is because the modules angularly collapse together on a curve, shifting all tension to the extreme outside of the belt.

In a variation of what is described above, the modules may be formed with full sets of projections, but projections are simply removed (by cutting, grinding, etc.) at positions where rollers are to be installed for a particular application of a conveyor belt. This can be done for either laterally curving belts or belts limited to straight travel. Thus, the system is versatile in that belts may be fabricated, using the same collection of modules, without any low back pressure feature, with relatively few rollers to reduce back pressure, or with a denser arrangement of rollers for reducing back pressure, all in accordance with the needs of the particular application to be served.

The invention also encompasses modular plastic conveyor belts limited to straight travel. Projections are removed or omitted at particular locations and rollers are installed as needed.

It is therefore among the objects of the invention to provide a versatile modular plastic conveyor belt construction, in a straight or radius type belt, wherein the modules can be put together with or without accumulation, back pressure reducing rollers. A collection of modules can be provided, some with roller spaces and some without or with spaces in different locations. A related object is an efficient, cost-effective construction wherein the rollers are supported by the same connecting rods that hold the modules together. These and other objects, advantages and features of the invention will be apparent from the following description of preferred embodiments, considered along with the accompanying drawings.

DESCRIPTION OF PREFERRED EMBODIMENTS

Figure 1:
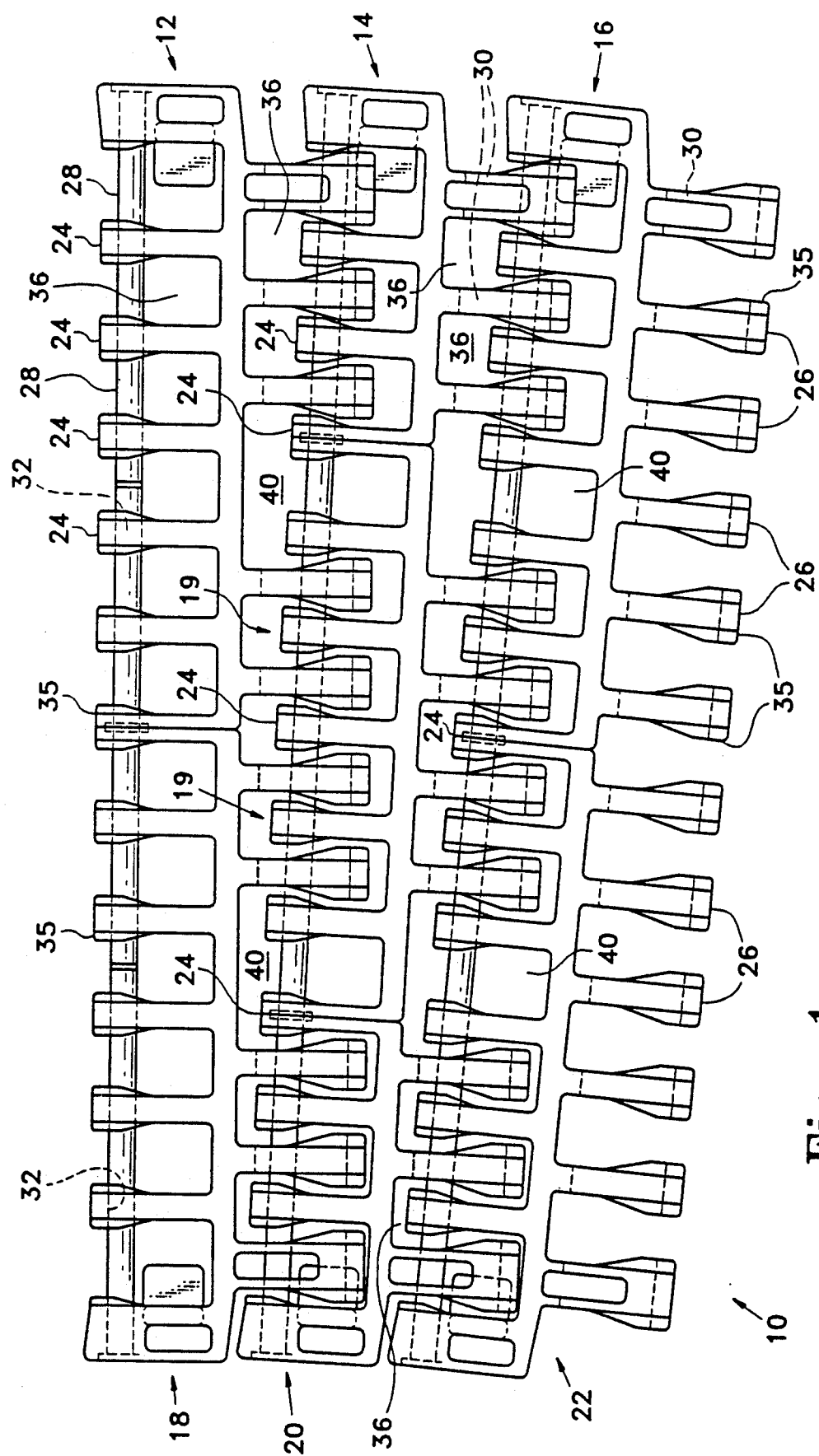
FIG. 1 is a plan view showing a portion of an assembled conveyor belt formed of plastic modules in accordance with the invention.

FIG. 1 shows a portion of a radius type conveyor belt 10, made up of modules 12, 14, 16, 18, 19, 20, 22 each having sets of first projections 24 extending in one direction and second projections 26 extending in the opposite direction. The first and second projections in this preferred embodiment are offset in staggered relationship in the well known manner such as shown in U.S. Pat. No. 4,742,907 and copending application Ser. No. 594,623, filed Oct. 9, 1990, so that each projection which is interdigited from one module into an adjacent module fits generally centrally between a pair of projections of the adjacent module. The projections are thus staggered and in alternating relationship as shown in the aforementioned patent and application. However, the projections on a module can be aligned front to back rather than staggered, but still staggered and interdigited with the projections of the adjacent module. In that event, provision can be made at ends of modules, i.e. additional molded material, to avoid large recesses.

As indicated in the drawings, the modules 12, 14, 16, etc. are connected together by connecting rods 28, preferably also of a plastic material, extending transversely through interdigited projections of the first and second type of adjacent modules. As indicated, the second projections 26, for a radius-type belt as shown, have slotted or elongated openings 30, while the first projections 24, extending in the opposite direction, preferably have non-slotted openings 32 within which the rod fits relatively closely. The elongated holes, in one set of projections, hold the connecting rod loosely enough to permit the radius-type conveyor belt 10 to travel around curves, angularly collapsing the modules together toward the inside of the curve in the well known manner as shown, for example, in U.S. Pat. No. 4,742,907.

In cooperation with these slotted openings, the projections 24 and 26 preferably have thickened ends 35 which are shaped generally as shown and with sufficient clearance between interdigited projections to allow angulation of the modules relative to one another for curves. At the inside of a curve, the thickened ends 35 extend into a wider space 36 between projections inward from the tips of the projections.

Figure 2:
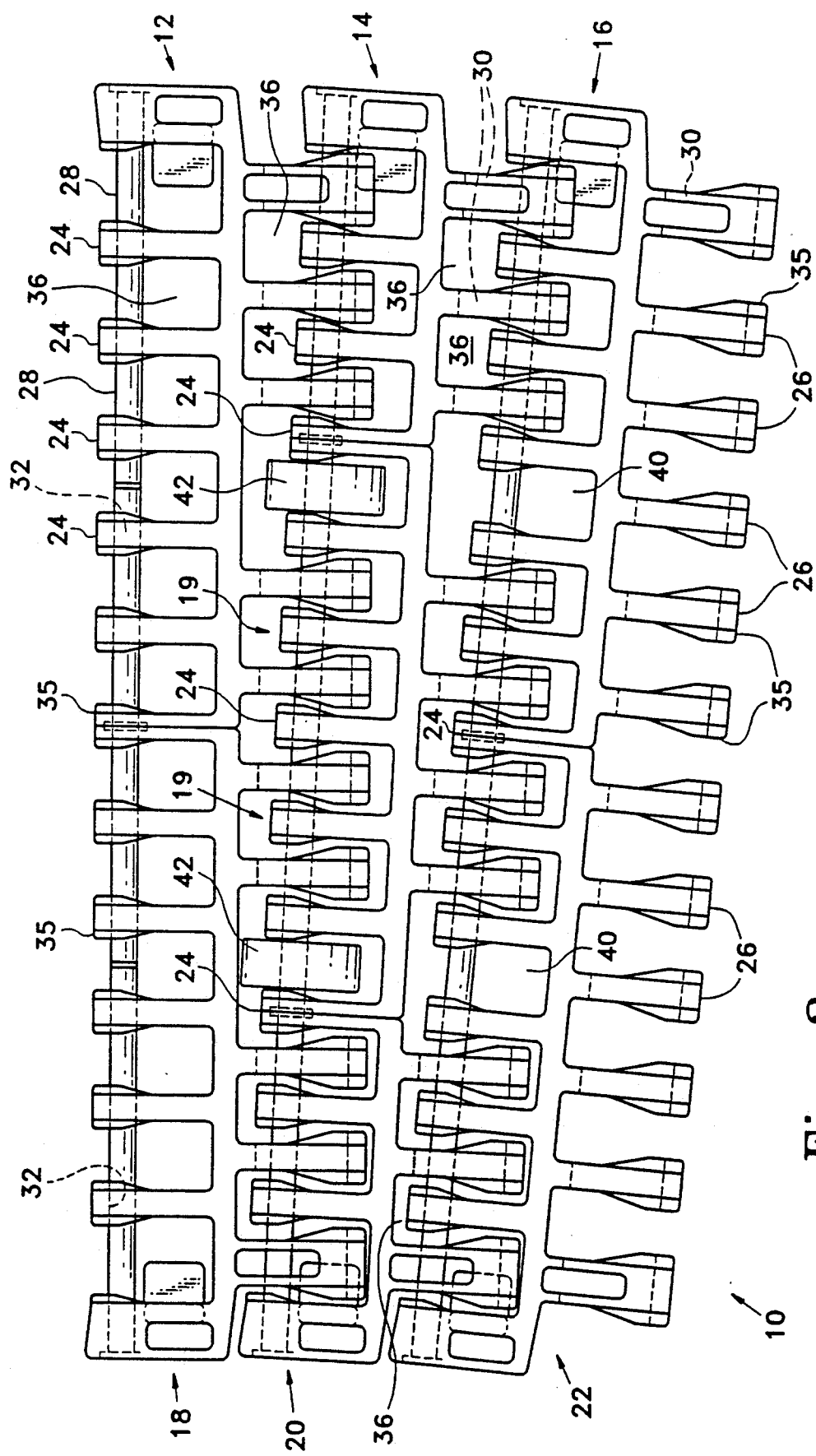
FIG. 2 is a view similar to FIG. 1, showing the same belt assembled with low back pressure rollers positioned in spaces provided for the optional receipt of the rollers.

Shown in FIGS. 1 and 2, the modules of the invention, or at least some of the modules making up a conveyor belt of the invention or in accordance with the method of the invention, include spaces 40 which are devoid of any projection. The voids or spaces 40 may be on either side of the module. However, they are better located on the side of the module which has the slotted-opening projections 26, for better support of the rod 28 across the width of the belt. This leaves a connecting rod 28 extending laterally across the space between projections 24 without any projection 26 filling this space and engaging over the connecting rod.

FIG. 2 illustrates that these spaces 40, or some of them, may be occupied by rollers 42, mounted directly on the connecting rod when the belt is assembled. These plastic rollers 42, of a plastic material which will roll with relatively low friction on the connecting rod (the rollers may be of polyethylene or nylon material and while the connecting rod may be of acetal or polyester material, for example, or other material) can be positioned as desired and as needed to reduce backline pressure on the working conveyor belt.

Therefore, the belt 10 and the modules of the invention can be used with or without backline pressure reducing rollers 42, making the modules highly versatile for use in a conveyor belt which does not need the low backline pressure feature, or a conveyor belt wherein some reduction of backline pressure is desired. Rollers may be positioned in some of the spaces or all of the spaces, depending on needs. For example, the rollers can be positioned every 4 inches, 6 inches or 8 inches along the length of the belt and at various locations across the width of the belt, in line with the rollers of successive modules or staggered. Also, the belt can be made up of modules which have such roller spaces and modules which do not have the roller spaces. In regard to the latter arrangement, the spaces 40 reduce the total tensile strength of the composite conveyor belt slightly, and if one of such modules is included in the belt, the strength is no further reduced by having additional such modules, if the spaces are generally at corresponding positions. One concern, in the case of some conveyed products, is that spaces not be left open in the belt. Thus, in some instances where small objects are carried, it may be desirable to use the modules with spaces only at those locations where rollers will actually be placed, filling the spaces. In many instances with larger objects, often in the food industry this is not a concern.

In a slight variation of the apparatus and procedure described above, the invention encompasses simply providing belt modules which have projections at every position, but modifying the modules in accordance with a particular application for which a belt is designed. Thus, projections are removed at locations where rollers are to be installed. On most plastic belt modules, the projections are easily removed by cutting and/or grinding operations.

As can be seen from the drawings, in the case of a radius type conveyor belt, the location of the rollers (proximity to the outside of the belt) and the size of the rollers can limit the radius of turn available, since the rollers should not engage against stationary structure of the modules. However, the radius of the rollers need not be large, only sufficient to extend a small distance above the plane of the belt's upper surface (e.g. 1/32 to 1/16 inch), and the rollers ordinarily need not be positioned very close to the edge of the belt. This enables the belt's radius of curvature to be as tight as required for almost all applications.

Figure 3:
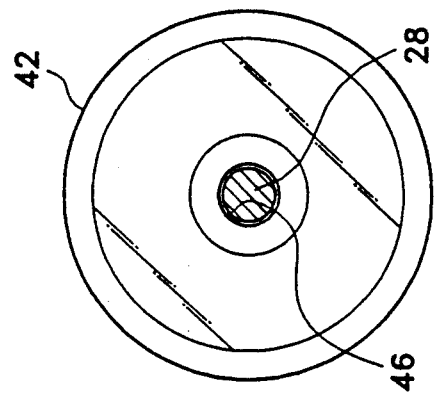
FIG. 3 is a side elevation view showing a roller and a connecting rod on which the roller is retained.

FIG. 3 is a detailed view in side elevation, showing a single roller 42 as mounted on a connecting rod 28. As indicated, the roller has a cylindrical opening 46 which is journaled relatively closely to the exterior of the rod, but permitting free rotation.

Figure 4:
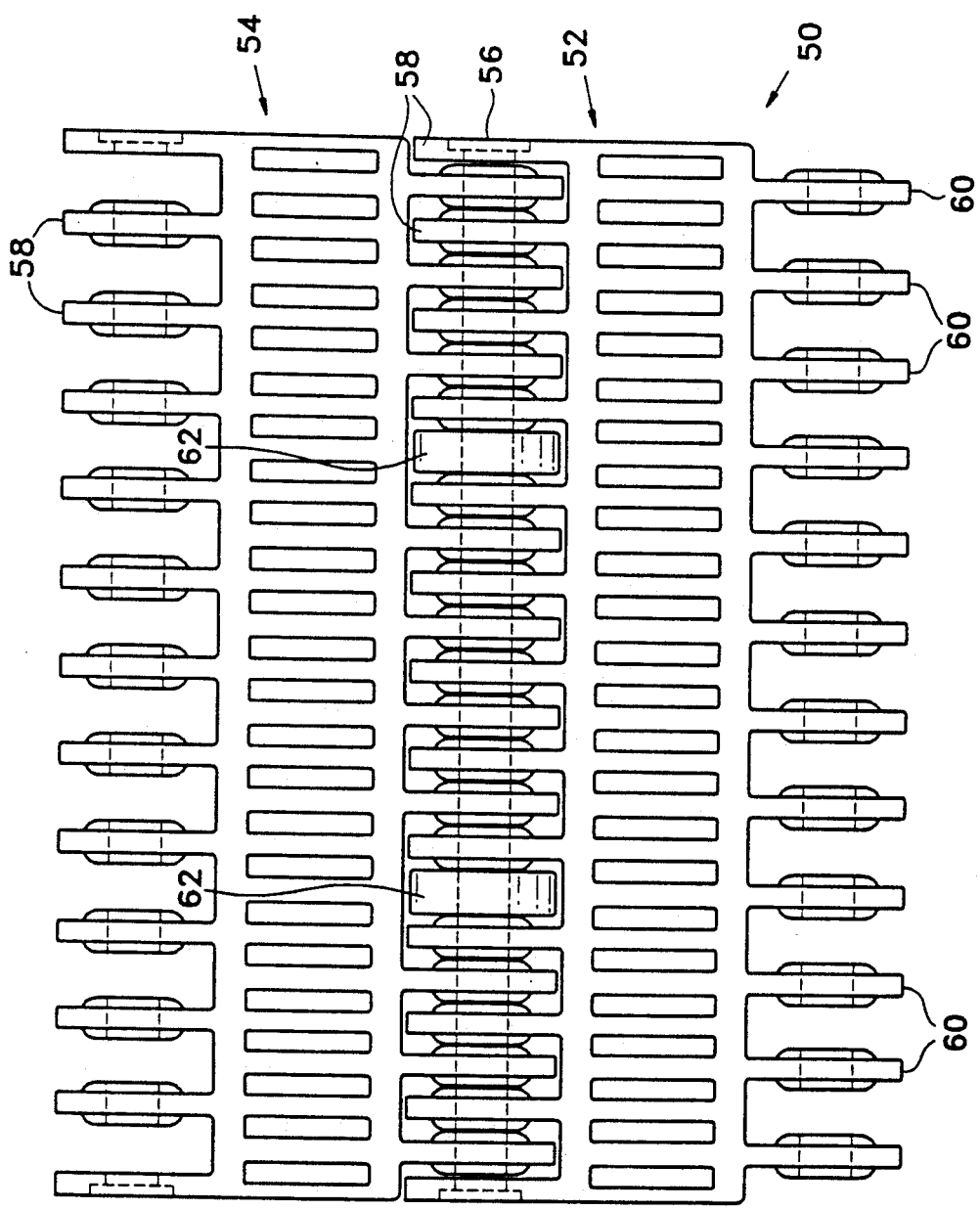
FIG. 4 is another plan view showing another embodiment of the invention, with a conveyor belt limited to straight travel.

FIG. 4 shows in plan view another embodiment of an accumulating or low back pressure type modular plastic conveyor belt 50, indicating a portion of the belt with two modules 52 and 54 linked together by a connecting rod 56. The belt 50 is of a type limited to straight travel. As in the embodiments described above, the belt modules 52 and 54 include projections 58 and 60 extending in opposite directions from the main body of the projection. In this embodiment, the projections 58 and 60 are staggered in position relative to one another, however, as described above, the forward and rearward projections may be aligned if desired, so long as they are interdigited with projections of the next succeeding module, generally as illustrated.

As FIG. 4 illustrates, rollers 62 may be positioned as desired, supported by the connecting rods 56 and in spaces where projections (in the illustrated embodiment, the projections 60) would normally be.

As described above relative to radius-type modular plastic conveyor belts, the invention encompasses either removing projections 60 or 58 as needed for positioning rollers advantageously for low back pressure as desired for the particular application, or a collection of plastic modules, some of which have spaces (without projections) at strategic locations and some of which do not. In the latter case, modules can be selected as desired from the collection of modules, and rollers can be assembled in positions as desired, to suit different applications and different degrees of need with the low back pressure feature.

FIG. 4 shows modules 56 and 58 which are adapted to be used, if desired, side-by-side with additional modules, to form a wider belt. The connecting rods 56 would then ordinarily pass through the entire width of the belt. Other rod arrangements can be used, with FIG. 1 illustrating a system of connecting rods which are discontinuous, made up of several pieces and retained via the ends of the rods. This is described in the referenced co-pending application Ser. No. 594,623. If that system of rod retention is used, it is preferable that rollers be located at positions other than the joints between rod sections. In any event, different connecting rod arrangements and retention arrangements can be used, still in accordance with the principles of the invention.

The above described preferred embodiments are intended to illustrate the principles of the invention but without limiting its scope. Other embodiments and variations to these preferred embodiments will be apparent to those skilled in the art and may be made without departing from the essence and scope of the invention as defined in the claims.

We claim:

1. In a modular plastic conveyor belt including a series of connected elongated molded plastic belt module rows each including one or more belt modules in the row, the belt module rows being connected by rods extending transversely to the length of the conveyor belt, each belt module row having a plurality of first spaced projections generally in a pattern of regular spacings extending in one direction from the row and a plurality of second spaced projections generally in a pattern of regular spacings extending an opposite direction from the row, the first projections, the first and second projections of serially adjacent module rows being longitudinally overlapping and juxtaposed when the modules are connected serially in the conveyor belt by the connecting rods extending through transverse openings in the projections, the improvement comprising, at least some of the plastic modules having spaces in the positions of certain of the projections, so that in the assembled conveyor belt made up of plastic modules with first and second projections overlapping and juxtaposed, the connecting rod extends at said spaces between projections of one module row without passing through a projection of an adjacent module row, such that a backline pressure reducing roller can be positioned on the connecting rod between said projections of the one module row if desired.

2. The conveyor belt of claim 1, wherein rollers for reducing backline pressure are positioned on connecting rods in said spaces so that the conveyor belt also serves as a low backline pressure conveyor belt.

3. The conveyor belt of claim 1, wherein the belt width is made up of plural staggered modules, with serially alternating module rows having different numbers of laterally aligned modules making up the width of the belt.

4. The conveyor belt of claim 1, wherein the belt is a radius-type conveyor belt, with the second projections of each module row having slotted openings to accommodate angular collapse of the belt for travel around curves.

5. The conveyor belt of claim 2, wherein the belt is a radius-type conveyor belt, with the second projections of each module row having slotted openings to accommodate angular collapse of the belt for travel around curves.

6. The conveyor belt of claim 5, said spaces being in the positions of said second, slotted projections.

7. The conveyor belt of claim 1, wherein the overlapping projections of adjacent modules are interdigited and alternating.

8. The conveyor belt of claim 7, wherein the first and second projections of a module are arranged generally in staggered relationship with each other.

9. The conveyor belt of claim 1, including belt modules with spaces at differing locations.

10. The conveyor belt of claim 1, including belt modules with said spaces and belt modules without said spaces.

11. A plastic conveyor belt module for use in forming a plastic conveyor belt made up of a series of serially interconnected belt module rows each including one or more generally similar such modules, comprising, a plurality of first spaced projections extending in a row in one direction from the module and a plurality of second spaced projections extending in a row in an opposite direction from the module, such that the modules can be assembled with the first and second projections of serially adjacent modules longitudinally overlapping and juxtaposed when the modules are connected serially in a conveyor belt by connecting rods extending through transverse openings in the projections, the row of second projections of the module having at least one space or void where one of such second projections would otherwise be located, whereby a backline pressure reducing roller can be positioned within said space or void in an assembled conveyor belt including the module, the roller having a central bearing support opening which receives a connecting rod extending transversely through juxtaposed first and second projections of succeeding modules in the belt, so that the roller is supported between adjacent first projections of the succeeding module in said void.

12. An assembled conveyor belt including the module of claim 11, and including a backline pressure reducing roller assembled in the belt between first projections of said succeeding module, the roller being located in one of said spaces or voids.

13. A plastic conveyor belt module as in claim 11, wherein the belt module when assembled in a plastic conveyor belt is adapted to follow a path including curving sections, with the transverse openings of one of the rows of projections being slotted to accommodate a curving path of the belt.

14. A plastic conveyor belt as in claim 13, wherein the slotted transverse openings are in the second projections of the module.

15. A plastic conveyor belt module as in claim 11, including a plurality of such conveyor belt modules, with said spaces or voids located in different positions in different modules.

16. A plastic conveyor belt module as in claim 11, as part of a collection of similar plastic conveyor belt modules which may be used together and interchangeably, with some of the modules including spaces or voids and some of the modules not including spaces or voids.

17. A method for forming a plastic conveyor belt having rollers for reducing backline pressure, comprising, providing a series of plastic conveyor belt modules each having a plurality of first spaced projections extending in a row in one direction from the module and a plurality of second spaced projections extending in a row from an opposite direction from the module, such that the modules can be assembled the first and second projections of serially adjacent modules longitudinally overlapping and juxtaposed when the modules are connected serially in a conveyor belt by connecting rods extending through transverse openings in the projections, removing one or more projections from one or more rows of first projections or second projections of the modules to form a space or void where said projections have been removed, and assembling the modules by connecting them serially with connecting rods which extend through the transverse openings, and with a back pressure reducing roller positioned directly on the connecting rod at the locations of the spaces or voids, thereby producing a low backline pressure conveyor.

* * * * *